(12) United States Patent
Didwiszus et al.

(10) Patent No.: US 12,135,091 B2
(45) Date of Patent: Nov. 5, 2024

(54) VALVE DEVICE OF A PNEUMATICALLY ACTUATABLE FRICTION CLUTCH

(71) Applicant: ZF CV Systems Europe BV, Brussels (BE)

(72) Inventors: Lars Didwiszus, Sarstedt (DE); Hauke Karstens, Kiel (DE); Michael Günther, Wennigsen (DE)

(73) Assignee: ZF CV Systems Europe BV, Brussels (BE)

( * ) Notice: Subject to any disclaimer, the term of this patent is extended or adjusted under 35 U.S.C. 154(b) by 202 days.

(21) Appl. No.: 17/794,349

(22) PCT Filed: Jan. 11, 2021

(86) PCT No.: PCT/EP2021/050355
§ 371 (c)(1),
(2) Date: Jul. 21, 2022

(87) PCT Pub. No.: WO2021/148263
PCT Pub. Date: Jul. 29, 2021

(65) Prior Publication Data
US 2023/0069417 A1    Mar. 2, 2023

(30) Foreign Application Priority Data

Jan. 23, 2020   (DE) ..................... 10 2020 101 512.7

(51) Int. Cl.
*F16K 15/18*     (2006.01)
*F16K 15/04*     (2006.01)

(52) U.S. Cl.
CPC ........ *F16K 15/1843* (2021.08); *F16K 15/048* (2013.01)

(58) Field of Classification Search
CPC ............. F16D 25/14; F16D 2048/0221; F16D 2048/0263; F16K 15/04; F16K 15/1823; F16K 15/1843; Y10T 137/87217
See application file for complete search history.

(56) References Cited

U.S. PATENT DOCUMENTS 2,648,311 A      8/1953  Price et al.
4,945,947 A *    8/1990  Westra ................... F16K 15/04
                                                         137/519.5
(Continued)

FOREIGN PATENT DOCUMENTS

DE            949867 C        9/1956
DE      102010038506 A1       2/2012
(Continued)

OTHER PUBLICATIONS

European Patent Office, Rijswijk, Netherlands, International Search Report of International Application No. PCT/EP2021/050355, Mailed Apr. 6, 2021, 3 pages.

*Primary Examiner* — Kevin F Murphy
(74) *Attorney, Agent, or Firm* — Dickinson Wright PLLC

(57) ABSTRACT

A valve device (2), of a pneumatically actuatable friction clutch engageable by spring force, includes at least one inlet valve (16, 18) connected on the input side to a pressurized supply line and on the output side to an actuating cylinder of the friction clutch. A pressure-sustaining valve (20, 28) is upstream or downstream of the inlet valve and is designed as a check valve closing in the backflow direction. The pressure-sustaining valve is a springless check valve and includes a housing ring (22, 30) having a retaining basket (36), a closing element (24, 32), and a valve seat (26, 34). The closing element, in the depressurized state and with a positive pressure gradient is held in the retaining basket (36) of the housing ring (22, 30) and, with a negative pressure (Continued)

gradient is pressed out of the retaining basket (36) and against the valve seat (26, 34).

20 Claims, 3 Drawing Sheets

(56) References Cited

U.S. PATENT DOCUMENTS

| | | | | |
|---|---|---|---|---|
| 6,457,487 | B1* | 10/2002 | Stephenson | F15B 13/0433 |
| | | | | 91/464 |
| 6,634,983 | B2 | 10/2003 | Nishimura | |
| 6,997,299 | B2* | 2/2006 | Brissenden | B60K 17/344 |
| | | | | 192/48.601 |
| 9,772,041 | B2* | 9/2017 | Graham | F16K 15/048 |
| 2010/0139787 | A1 | 6/2010 | Li | |
| 2020/0408322 | A1* | 12/2020 | Foerch | B60T 13/686 |

FOREIGN PATENT DOCUMENTS

| | | |
|---|---|---|
| DE | 102011075168 A1 | 11/2012 |
| EP | 0255982 A2 | 2/1988 |
| EP | 0726855 A1 | 8/1996 |
| EP | 3374675 A1 | 9/2018 |
| GB | 606229 A | 8/1948 |
| JP | S59180128 A | 10/1984 |

* cited by examiner

VALVE DEVICE OF A PNEUMATICALLY ACTUATABLE FRICTION CLUTCH

FIELD

The present disclosure relates to a valve device of a pneumatically actuatable friction clutch, which is arranged in a vehicle between a drive motor and a gearbox and can be engaged by means of spring force, having at least one inlet valve, which is connected on the inlet side to a pressurized supply line and on the outlet side to a working chamber of an actuating cylinder of the friction clutch and is designed as a 2/2-way solenoid seat valve, an outlet valve, which is connected on the inlet side to the working chamber of the actuating cylinder and on the outlet side to a vent outlet and is designed as a 2/2-way solenoid seat valve, and a pressure-sustaining valve, which is arranged upstream or downstream of the inlet valve and is designed as a check valve which closes in the backflow direction.

BACKGROUND

In a pneumatically disengageable and engageable friction clutch, the opening of an inlet valve enables the associated actuating cylinder to be supplied with air from the supply line, thereby disengaging the friction clutch against the restoring force of a closing or pressure spring. Opening an outlet valve releases air from the actuating cylinder, such that the friction clutch is engaged again under the action of a closing or pressure spring. When the actuating cylinder is being supplied with air and the inlet valve is closed, a pressure-sustaining valve has the function of maintaining the working pressure in the actuating cylinder, at least over a certain period of time, if the supply pressure prevailing in the supply line drops, for example as a result of a defect in the compressed-air supply device, a line break, or a relatively large withdrawal of compressed air by another load. Because of the design being a seat valve, the inlet valve is not capable of maintaining the working pressure enclosed in the actuating cylinder in the closed state because the shifting element, which is designed as a diaphragm or piston, is pushed away from the valve seat in the case of a negative pressure gradient, that is to say a higher pressure in the working chamber of the actuating cylinder than in the supply line.

DE 10 2011 075 168 A1, which describes a method for detecting a leakage in the actuating device of a pneumatically actuatable friction clutch, describes a circuit diagram with a valve device of a pneumatically actuatable friction clutch in which a check valve which closes in the backflow direction is connected upstream of an inlet valve for the actuating cylinder of the friction clutch. The check valve is intended to prevent release of air from the actuating cylinder and thus unintentional engagement of the friction clutch in the event of a drop in the supply pressure in the supply line caused by a fault.

With regard to unintentional engagement of the friction clutch, a starting situation in which the drive engine is running, the friction clutch is disengaged, and a starting gear is engaged may be regarded as critical, in particular, because the engagement of the friction clutch caused by a sudden release of air from the actuating cylinder would then lead to abrupt starting of the vehicle. However, if the air pressure prevailing in the working chamber of the actuating cylinder is held largely constant by the pressure-sustaining valve, at least over a certain period of time which is sufficient to disengage the starting gear and/or to stop the drive engine, such uncontrolled starting of the vehicle can be prevented.

Up to now, the pressure-sustaining valve has been designed as a conventional check valve, in which a generally spherical closing element is pressed against a valve seat in the closing direction by a valve spring. Such a check valve consists of precision parts and is therefore relatively complex and expensive to produce. With each admission of air to the actuating cylinder or with each disengagement of the friction clutch, the closing element is pushed away from the valve seat counter to the closing direction, against the restoring force of the valve spring, by an effective positive pneumatic pressure gradient, and the check valve is thus opened. When the actuating cylinder is vented via the outlet valve, the closing element is pressed against the valve seat again under the action of the valve spring and strikes against the valve seat. Because the disengagement and engagement of the friction clutch takes place several million times in the course of the service life of a vehicle, a pressure-sustaining valve designed as a conventional check valve is subject to high wear and may therefore cease to function at some point. In addition, studies that have been carried out have shown that a pressure drop in the supply line caused by a fault, for which the installation of the pressure-sustaining valve is actually intended, occurs relatively rarely and occurs less than ten times in the course of the service life of a vehicle.

SUMMARY

The object underlying the present disclosure is therefore to provide a valve device of a pneumatically actuatable friction clutch of the type mentioned above, having a pressure-sustaining valve, which is arranged upstream or downstream of the inlet valve and which is of simple construction, that can be produced inexpensively and can be operated with low wear.

This object is achieved by a valve device having the features described herein Advantageous embodiments and developments are further defined herein.

Accordingly, the present disclosure provides a valve device for a pneumatically actuatable friction clutch, which is arranged in a vehicle between a drive motor and a gearbox and can be engaged by spring force, having at least one inlet valve, which is connectable on the inlet side thereof to a pressurized supply line and on the outlet side thereof to a working chamber of an actuating cylinder of the friction clutch, and which inlet valve is designed as a 2/2-way solenoid seat valve, an outlet valve, which is connected on the inlet side thereof to the working chamber of the actuating cylinder and on the outlet side thereof to a vent outlet, and which outlet valve is designed as a 2/2-way solenoid seat valve, and a pressure-sustaining valve, which is arranged upstream or downstream of the inlet valve and is designed as a check valve that closes in the backflow direction.

To achieve the above stated object, provision is made in the valve device for the pressure-sustaining valve to be a check valve without a valve spring and to include a housing ring having a retaining cage, a closing element, and a valve seat, wherein the closing element of the pressure-sustaining valve, in the unpressurized state and with a positive pressure gradient from the direction of the outlet bore of the associated inlet valve, can be held by interlocking and frictional engagement in the retaining cage of the housing ring and, with a negative pressure gradient in the direction of the outlet bore of the associated inlet valve, can be lifted out of the retaining cage and pressed against the valve seat.

As a result of the design of the pressure-sustaining valve as a check valve without a valve spring, in which the closing element is held by interlocking and frictional engagement in the retaining cage of the housing ring in the unpressurized state and with a positive pressure gradient, and is lifted out of the retaining cage and pressed against the valve seat with a negative pressure gradient, the pressure-sustaining valve according to the present disclosure, in particular such a valve with a soft closing element, is largely free of wear. The closing element is pushed out of the retaining cage of the housing ring and the pressure-sustaining valve is closed only in the relatively rarely occurring case of a fault where the supply pressure in the supply line suddenly drops when the actuating cylinder of the friction clutch was pressurized and thus the friction clutch was disengaged. As a result, the air pressure enclosed in the working chamber of the actuating cylinder is held there at least until the drive engine is switched off. In contrast, during normal operation of the friction clutch and the relevant compressed air circuit, the closing element remains in the retaining cage of the housing ring and, unlike in a conventional check valve, is not moved during disengagement and engagement of the friction clutch. It is therefore also possible for the pressure-sustaining valve according to the present disclosure to be produced by simple shaping and by the use of favorable materials with little production effort at low cost. In addition, it should be noted that the valve arrangement presented is very compact in terms of installation space in comparison with a conventional check valve.

In a preferred embodiment of the valve device of the present disclosure, the retaining cage of the housing ring includes retaining webs which are formed radially on the inside of the housing ring and are arranged in a manner distributed around the circumference, and that these retaining webs each have an inner surface, in the form of a segment of a circle, which together form a retaining geometry, in the form of a segment of a sphere, of the retaining cage. As a result, there are sufficiently large apertures on the circumference of the housing ring between the retaining webs providing for the throughflow of compressed air in the open state of the respective pressure-sustaining valve.

In order to avoid expensive mechanical fine machining of the retaining cage or the retaining webs and the valve seat, the closing element advantageously has a spring-elastic surface. By virtue of this elastic surface, the closing element adapts both to the contour of the retaining cage or the retaining webs in the open state of the pressure-sustaining valve and also to the contour of the valve seat in the closed state of the pressure-sustaining valve. This geometric adaptation of the closing element is comparatively small and reversible, which ensures that the closing element alternately does not secure firmly in the retaining cage and also rests in a sealing manner against the valve seat of the inlet valve. In addition, the elastic surface of the closing element prevents mechanical wear on the retaining cage or its retaining webs and on the valve seat.

To obtain the spring-elastic surface of the closing element, the closing element can be produced entirely from a spring-elastic material. As an alternative to this, however, the closing element can also have a core formed of a hard material that is coated with a spring-elastic material. However, the closing element can also have a central cavity which is surrounded in the form of a spherical shell by the spring-elastic material. As a result, the closing element has a particularly low weight. The spring-elastic material of the closing element is preferably rubber or silicone rubber.

Because the closing force of the closing element at the inlet valve depends on the flow resistance and the mass of the closing element, the flow resistance of the closing element is designed as high as possible and its mass is designed as low as possible.

In a preferred embodiment of the valve arrangement according to the present disclosure, the pressure-sustaining valve is arranged downstream of the inlet valve and is arranged close to the outlet bore of the inlet valve, and the edge of the outlet bore of the inlet valve serves and/or is designed as a valve seat of the pressure-sustaining valve. As a result, a valve seat on the valve side, that is to say a valve seat designed as a component of the housing ring, for example, is provided in a cost-effective and space-saving manner.

BRIEF DESCRIPTION OF THE DRAWINGS

The present disclosure is explained in greater detail below by means of an exemplary embodiment illustrated in the appended drawings. In the drawings.

DETAILED DESCRIPTION

Figure 1:
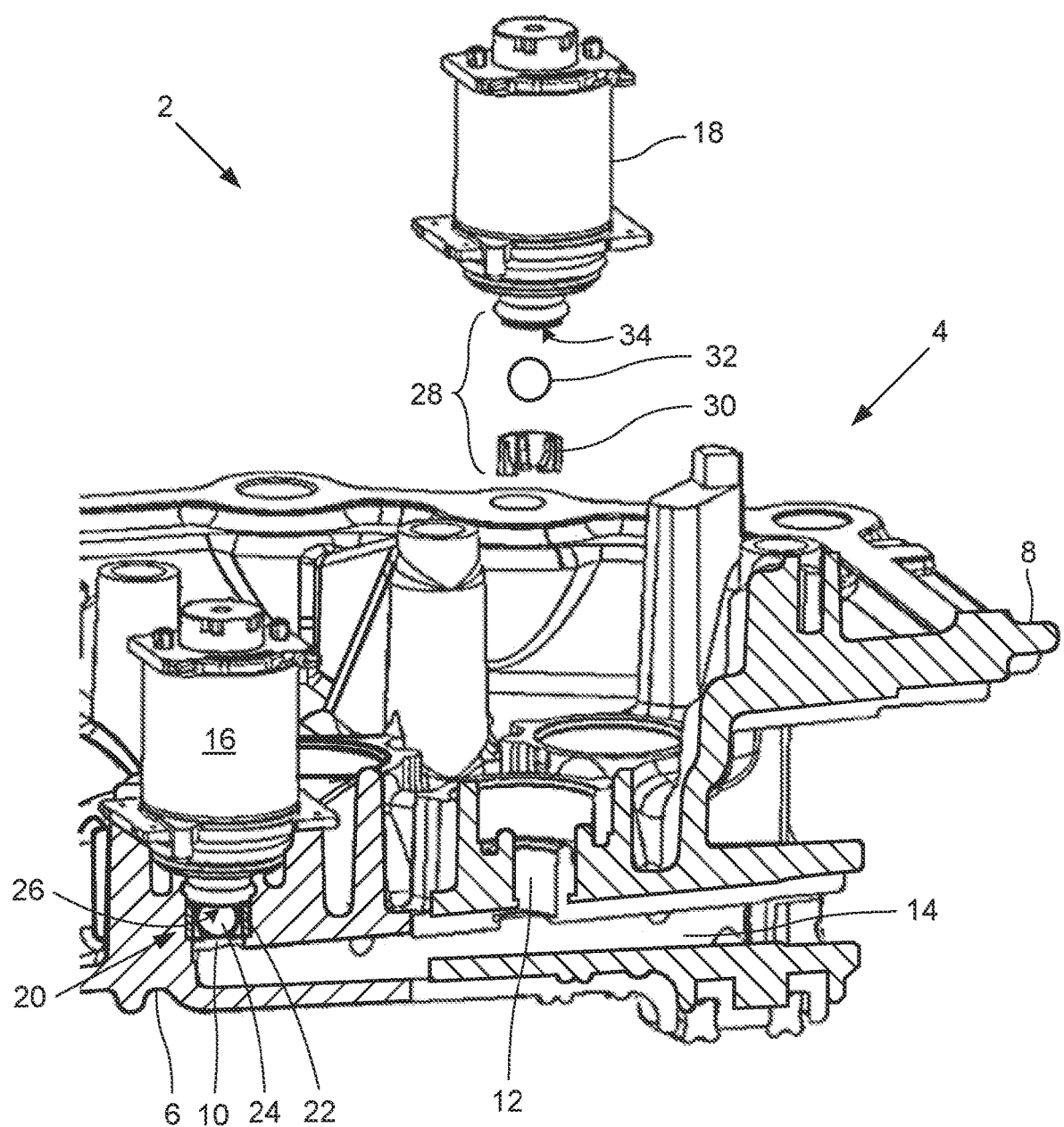
FIG. 1 is a partial perspective sectional view illustrating a control module of a valve device of a pneumatically actuatable friction clutch having two inlet valves and two pressure-sustaining valves according to the present disclosure, FIG. 2 a perspective sectional view and side view illustrating a housing ring and a closing element of the pressure-sustaining valve according to FIG. 1.

A valve device 2, illustrated in FIG. 1, of a pneumatically actuatable friction clutch has two inlet valves 16, 18 and two pressure-sustaining valves 20, 28, which are arranged in a two-part housing 6, 8 of a control module 4. The inlet valves 16, 18 are designed as 2/2-way solenoid seat valves and are each arranged in one of two connecting channels 10, 12, which connecting channels 10, 12 are arranged in parallel between an inlet channel, not visible here, to which a pressurized supply line is connected, and an outlet channel 14, to which an actuating cylinder, not shown here, of the friction clutch is connected. The pressure-sustaining valves 20, 28 are designed as check valves without valve springs, which check valves close in the backflow direction and are in each case connected downstream of one of the inlet valves 16, 18 in the respective connecting channel 10, 12.

FIG. 1 illustrates the first inlet valve 16 and the associated first pressure-sustaining valve 20 in the installed state and the second inlet valve 18 and the associated second pressure-sustaining valve 28 in the uninstalled state above the housing 8. The inlet valves 16, 18 can be of identical construction or can have different opening cross sections. The pressure-sustaining valves 20, 28 are of identical construction and in each case comprise a housing ring 22, 30 with a retaining cage 36 (FIG. 2), a closing element 24, 32 and a valve seat 26, 34.

Figure 2:
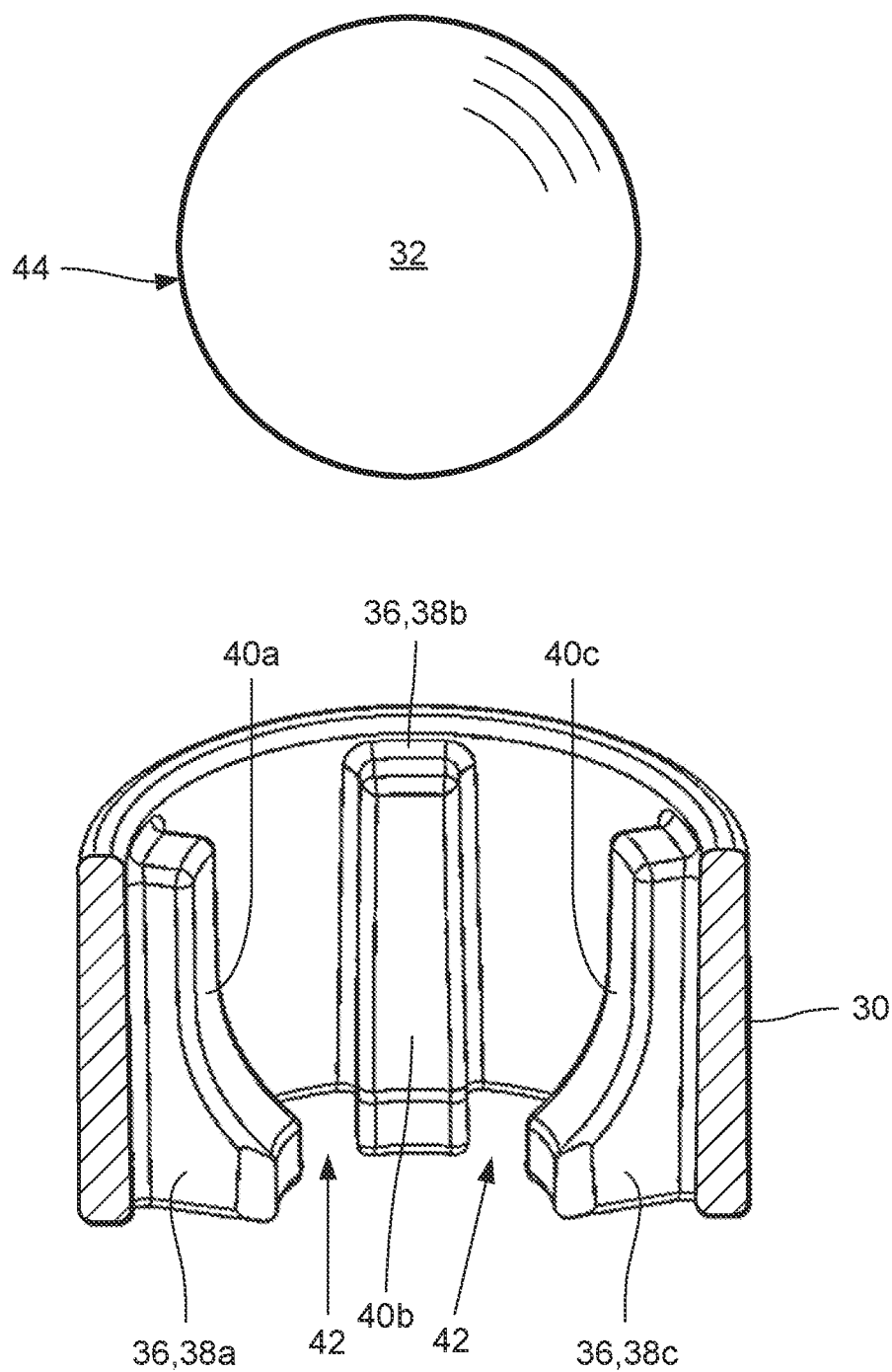

FIG. 2 illustrates, by way of example, the housing ring 30 and the closing element 32 of the second pressure-sustaining valve 28 on an enlarged scale. The closing element 32 of the pressure-sustaining valve 28 is of spherical design, and the retaining cage 36 of the housing ring 30 comprises retaining webs 38*a*, 38*b*, 38*c*, which are arranged radially on the inside of the housing ring 30 in a manner distributed around the circumference and have inner surfaces 40*a*, 40*b*, 40*c*, which are in the form of segments of a circle and form a retaining geometry, in the form of a segment of a sphere, of the retaining cage 36. There are sufficiently large apertures 42 around the circumference between the retaining webs 38a, 38b, 38c for the throughflow of compressed air in the open state of the pressure-sustaining valve 28.

The closing element 32 has a spring-elastic surface 44. For this purpose, the closing element 32 can be produced entirely from a spring-elastic material, such as rubber or silicone rubber, or can have a core made of a hard material which is coated with a spring-elastic material. In the installed state, the pressure-sustaining valves 20, 28 are in each case arranged close to the outlet bore of the associated inlet valve 16, 18 and use the edge of the relevant outlet bore as a valve seat 26, 34.

To disengage the friction clutch, the inlet valves 16, 18 are supplied with current and are thereby opened. The working chamber of the actuating cylinder of the friction clutch is thereby supplied with air from the supply line, as a result of which the friction clutch is disengaged against the restoring force of a closing or pressure spring. To engage the friction clutch, the inlet valves 16, 18 are switched off and thereby closed again, and outlet valves, not shown here, designed as 2/2-way solenoid seat valves, are supplied with current and thereby opened. The working chamber of the actuating cylinder of the friction clutch is thereby vented into a vent line leading to a vent outlet, as a result of which the friction clutch is engaged again under the action of the closing or pressure spring, this being known per se to a person skilled in the art.

In the unpressurized state and with a positive pressure gradient, that is to say when the pressure in the supply line is higher than in the working chamber of the actuating cylinder, the closing element 24, 32 of the respective pressure-sustaining valve 20, 28 is held by interlocking and frictional engagement in the retaining cage 36 of the housing ring 22, 30. In the case of a negative pressure gradient, that is to say when the pressure in the supply line is lower than in the working chamber of the actuating cylinder, this being established in the case of a drop in the supply pressure in the supply line caused by a fault, the closing element 24, 32 is pushed out of the retaining cage 36 and pressed against the respective valve seat 26, 34 of the inlet valves 16, 18. In this way, the connecting channels 10, 12 are blocked and release of air from the actuating cylinder and thus unintentional engagement of the friction clutch is prevented.

Figure 3:
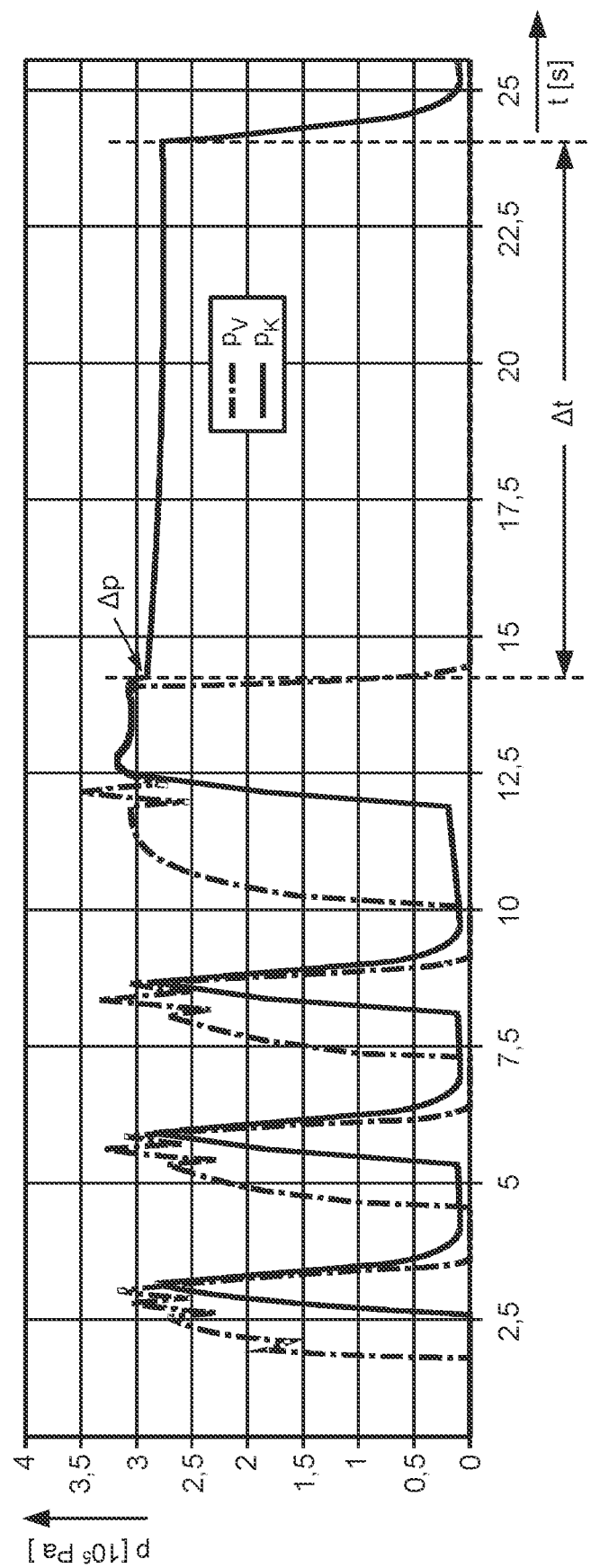
FIG. 3 is a diagram illustrating time curves of a supply pressure and a clutch pressure.

In the diagram shown in FIG. 3, the effect of the pressure-sustaining valves 20, 28 is illustrated on the basis of the curves of the supply pressure $p_v$ which is present in the supply line and of the clutch pressure $p_k$ which is effective in the working chamber of the actuating cylinder of the friction clutch, over the time t in seconds s. Up to time t=10 s, the supply pressure $p_v$ is increased three times from 0 Pa to about $3 \times 10^5$ Pa and reduced again to 0 Pa. When the inlet valves 16, 18 are open and the pressure-sustaining valves 20, 28 are not present or active, the clutch pressure $p_k$ follows the supply pressure $p_v$ with a delay of approximately 0.5 s when air is admitted to the actuating cylinder and almost without any delay when the actuating cylinder is vented.

From time t=10 s, from which the supply pressure $p_v$ rises again from 0 Pa to approximately $3 \times 10^5$ Pa, the pressure-sustaining valves 20, 28 are present and active. The inlet valves 16, 18 are then opened at time t=11.5 s, with the result that air is admitted to the working chamber of the actuating cylinder and the friction clutch is disengaged. After the supply pressure $p_v$ drops to 0 Pa at time t=14 s as a result of a fault, the pressure-sustaining valves 20, 28 close automatically, with the result that the clutch pressure $p_k$ drops by a pressure difference $\Delta p$ of approximately $0.2 \times 10^5$ Pa as a result of the switching time but is then kept very largely constant over a period of time $\Delta t$ of approximately 10 seconds. In a starting process with the drive engine running and the starting gear engaged, this period of time is sufficient by far to disengage the starting gear and/or to stop the drive engine. In such a starting situation, the effect of the pressure-sustaining valves 20, 28 can thus reliably prevent uncontrolled abrupt starting of the relevant vehicle.

FIG. 3 also shows that the pressure-sustaining valve 20, 28 without a valve spring advantageously completely ignores a certain, comparatively small drop in the clutch pressure $p_k$ before it performs its function as a check valve. In the example presented, this pressure difference $\Delta p$ is approximately $0.2 \times 10^5$ Pa at time t=14 s at an outlet pressure of $3 \times 10^5$ Pa. Such a pressure drop does not yet lead to closing of the friction clutch.

As a result of the spring-elastic surface 44, the closing elements 24, 32 conform in a form-fitting manner to the inner surfaces 40a, 40b, 40c of the retaining webs 38a, 38b, 38c of the housing rings 22, 30 in the open state of the pressure-sustaining valves 20, 28 and to the edges, acting as valve seats 26, 34, of the outlet bores of the inlet valves 16, 18 in the closed state of the pressure-sustaining valves 20, 28. It is therefore possible for the housing rings 22, 30 and retaining webs 38a, 38b, 38c of the pressure-sustaining valves 20, 28 to be of relatively simple design and to be produced at low cost. Moreover, as a result, no mechanical fine machining of the inlet valves 16, 18 in the region of the bore edges 26, 34 of the outlet bores is required. Because the pressure-sustaining valves 20, 28 are closed only in the event of a very rarely occurring pressure drop in the supply pressure $p_v$ while the actuating cylinder of the friction clutch is being supplied with air, this type of construction of the pressure-sustaining valves 20, 28 is largely free of wear in comparison with conventional check valves and is therefore very functionally reliable.

While the above description constitutes the preferred embodiments of the present invention, it will be appreciated that the invention is susceptible to modification, variation and change without departing from the proper scope and fair meaning of the accompanying claims.

REFERENCE SIGNS 2 valve device
4 control module
6 first part of the housing
8 second part of the housing
10 first connecting channel
12 second connecting channel
14 outlet channel
16 first inlet valve, 2/2-way solenoid seat valve
18 second inlet valve, 2/2-way solenoid seat valve
20 first pressure-sustaining valve, check valve
22 first housing ring
24 first closing element, ball
26 first valve seat, bore edge
28 second pressure-sustaining valve, check valve
30 second housing ring
32 second closing element, ball
34 second valve seat, bore edge
36 retaining cage
38a first retaining web
38b second retaining web
38c third retaining web 40a first inner surface
40b second inner surface
40c third inner surface
42 apertures between retaining webs
44 surface of the closing element
p pressure
$p_k$ clutch pressure
$p_v$ supply pressure
t time, point in time
Δp pressure difference
Δt period of time

The invention claimed is:

1. A valve device (2) for a pneumatically actuatable friction clutch arranged in a vehicle between a drive motor and a gearbox, which friction clutch is configured to be engaged by means of spring force, the valve device comprising:
at least one inlet valve (16, 18), which is connectable on an inlet side of the at least one inlet valve to a pressurized supply line and on an outlet side of the at least one inlet valve to a working chamber of an actuating cylinder of the friction clutch, the at least one inlet valve designed as a 2/2-way solenoid seat valve, wherein the working chamber of the friction clutch is configured for being connected to an outlet valve, which outlet valve is connectable on an inlet side of the outlet valve to the working chamber of the actuating cylinder and on an outlet side of the outlet valve to a vent outlet, and the outlet valve is designed as a 2/2-way solenoid seat valve, and
a pressure-sustaining valve (20, 28), which is arranged upstream or downstream of the inlet valve (16, 18) and is designed as a check valve which closes in the backflow direction,
wherein the pressure-sustaining valve (20, 28) is designed as a check valve without a valve spring and comprises:
a housing ring (22, 30) having a retaining cage (36),
a closing element (24, 32), and
a valve seat (26, 34),
wherein the closing element (24, 32) of the pressure-sustaining valve (20, 28), in a depressurized state and/or with a positive pressure gradient from the direction of an outlet bore of the associated inlet valve (16, 18) defined as when pressure in the supply line is higher than in the working chamber of the actuating cylinder, is held by interlocking and frictional engagement in the retaining cage (36) of the housing ring (22, 30) and,
wherein the closing element (24, 32) of the pressure-sustaining valve (20, 28), with a negative pressure gradient in the direction of the outlet bore of the associated inlet valve (16, 18) defined as when pressure in the supply line is lower than in the working chamber of the actuating cylinder, can be lifted out of the retaining cage (36) and pressed against the valve seat (26, 34) to block pressurized air from exiting the working chamber through the at least one inlet valves.

2. The valve device as claimed in claim 1, wherein the retaining cage (36) of the housing ring (22, 30) comprises retaining webs (38a, 38b, 38c) which are formed radially on the inside of the housing ring (22, 30) and are arranged in a manner distributed around the circumference, and wherein the retaining webs (38a, 38b, 38c) each have an inner surface (40a, 40b, 40c) in the form of a segment of a circle, which inner surfaces together form a retaining geometry, in the form of a segment of a sphere, of the retaining cage (36).

3. The valve device as claimed in claim 2, wherein the closing element (24, 32) of the pressure-sustaining valve (20, 28) is of spherical design and has a spring-elastic surface (44).

4. The valve device as claimed in claim 3, wherein the closing element (24, 32) is composed entirely of a spring-elastic material.

5. The valve device as claimed in claim 3, wherein the closing element (24, 32) has a core of a hard material, and wherein the core is coated with a spring-elastic material.

6. The valve device as claimed in claim 3, wherein the closing element (24, 32) has a central cavity which is surrounded in the form of a spherical shell by the spring-elastic material.

7. The valve device as claimed in claim 3, wherein the spring-elastic material of the closing element (24, 32) is rubber.

8. The valve device as claimed in claim 3, wherein the spring-elastic material of the closing element (24, 32) is silicone rubber.

9. The valve device as claimed in claim 2, wherein apertures are defined circumferentially between the retaining webs, through which apertures pressurized air will flow when the closing element is held by the holding ring, the inlet valve is open, and the pressure in the supply line greater than the pressure in the working chamber.

10. The valve device as claimed in claim 9, wherein the apertures are arranged circumferentially around the closing element when the closing element is held in the retaining cage.

11. The valve device as claimed in claim 1, wherein the pressure-sustaining valve (20, 28) is connected downstream of the inlet valve (16, 18) and is arranged adjacent the outlet bore of the inlet valve (16, 18), and wherein the edge of the outlet bore of the inlet valve (16, 18) serves as and/or is designed as a valve seat (26, 34) of the pressure-sustaining valve (20, 28).

12. The valve device as claimed in claim 1, wherein the closing element (24, 32) is pressed against the valve seat in response to a drop in pressure in the supply line when the inlet valve is open to maintain a pressurized state in the working chamber of the friction clutch.

13. The valve device as claimed in claim 12, wherein the closing element is held in the retaining cage and moved from the retaining cage without a spring force applied thereto.

14. The valve device as claimed in claim 1, wherein, during the positive pressure gradient when the pressure in the supply line is greater than the pressure in the working chamber, pressurized air flows past the closing element and through the holding ring toward the working chamber when the closing element is pressed against and held by the closing ring and the inlet valve is open.

15. The valve device as claimed in claim 14, wherein during the negative pressure gradient when the pressure in the supply line drops below the pressure in the working chamber, pressurized air flows through the holding ring and presses the closing element against the valve seat, and is blocked from flowing through the inlet valve when the inlet valve is open.

16. The valve device as claimed in claim 1, wherein the at least one inlet valve includes two inlet valves each having an associated connecting channel in communication with a common outlet channel for connecting to the working chamber of the friction clutch, wherein the connecting channels are connected in parallel to the outlet channel.

17. The valve device as claimed in claim 1, wherein the closing member remains retained in the holding ring during normal pressurization and depressurization of the working chamber of the friction clutch via controlled opening and closing of the inlet and outlet valves, and the closing element shifts out of retention from the holding ring only in response to a fault in the supply line in which the pressure in the supply line drops and backflow from the pressurized working chamber forces the closing element out of the holding ring.

18. The valve device as claimed in claim 1, wherein pressurized air from the supply line flows past the closing element and to the working chamber when the closing element is held in the retaining ring and the inlet valve is opened.

19. The valve device as claimed in claim 1, wherein the closing element is held in the retaining ring without a spring force applied thereto.

20. The valve device as claimed in claim 19, wherein the closing element is moved out of the retaining without a spring force applied thereto.

\* \* \* \* \*